Patented Dec. 17, 1940

2,225,476

UNITED STATES PATENT OFFICE 2,225,476

WATER SOLUBLE OXAZINE DYESTUFF

Fritz Hess, Frankfort-on-the-Main-Hochst, and Heinz Pardon, Ludwigshafen-on-the-Rhine, Germany, assignors to General Aniline & Film Corporation, a corporation of Delaware No Drawing. Application September 28, 1938, Serial No. 232,104. In Germany November 16, 1937

5 Claims. (Cl. 260—244)

The present invention relates to water-soluble oxazine dyestuffs.

We have found that brown water-soluble oxazine dyestuffs fast to light are obtained by condensing in the presence of an acid-binding agent to form the corresponding oxazine-compound, a 2.4.6-trinitrobenzene containing a substituent capable of being exchanged for an amino-radical, for instance, chlorine, bromine or an alkoxy group, with an ortho-aminophenol containing one or more groups causing solubility in water. The condensation is preferably conducted by heating the reaction components in aqueous alkaline solution. Groups causing solubility in water are sulfonic and carboxylic acid groups. As 2.4.6-trinitrobenzene compounds there may, for instance, be used picryl chloride, picryl bromide or trinitroanisol. By this process new water-soluble dinitro-oxazine dyestuffs are obtained, for instance those of the following constitution:

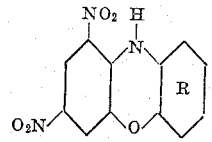

wherein the nucleus R contains a water solubilizing radical of the group consisting of carboxylic acid and sulfonic acid radicals which may be used for dyeing wool and leather and are distinguished by a high penetration in dyeing leather. In comparison with known similar dyestuffs the dyestuffs of the present invention are distinguished by a superior fastness to light.

The following examples serve to illustrate the invention, but they are not intended to limit it thereto; the parts are by weight:

(1) 19 parts of the hydrochloride of 3-amino-2-hydroxy-benzoic acid are dissolved in a hot solution of 200 parts of water and 10.6 parts of anhydrous sodium carbonate, 13.6 parts of crystallized sodium acetate and 25 parts of picryl chloride are added and the whole is heated for one day at 95° C., while stirring. At first, a primary condensation product precipitates with elimination of hydrogen chloride, but this in greater part redissolves with formation of red vapors of nitrous acid, indicating the formation of an oxazine ring. In order to complete the reaction the mixture is rendered alkaline by means of caustic soda solution, boiled for a short time, cooled and acidified with hydrochloric acid and the product which has separated is filtered. If the dyestuff-acid thus obtained is treated with a sodium carbonate solution about 33 parts of the brown sodium salt of the dyestuff are obtained. The product has the following constitution:

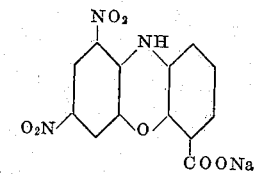

(2) 186.4 parts of 3-amino-2-hydroxy-5-sulfobenzoic acid are dissolved in a solution prepared from 1000 parts of water and 132 parts of anhydrous sodium carbonate and the whole is heated on a boiling water bath with 200 parts of picryl chloride while stirring. A rather vivid reaction sets in. The solution becomes brown and after some time vapors of nitrous acid are evolved. The elimination of nitrous acid is essentially finished after heating for about 8-9 hours. The dyestuff solution thus obtained is evaporated. 425 parts of a brown dyestuff which is easily soluble are obtained. It has the following constitution:

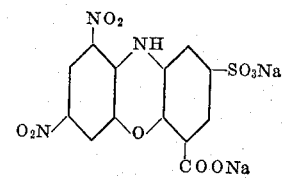

By using in this process instead of picryl chloride an equivalent amount of 2.4.6-trinitroanisol, the same dyestuff is obtained.

(3) 21 parts of 3-amino-4-hydroxy-1-methyl-benzene-5-sulfonic acid are dissolved in a hot solution prepared from 400 parts of water and 11 parts of anhydrous sodium carbonate, and the whole is stirred with 25 parts of picryl chloride at 95° C. for one day. After addition of caustic soda solution the whole is boiled for a short time, acidified and the product which has separated is filtered. From the dyestuff-sulfonic acid the sodium salt is obtained by a treatment with sodium carbonate. About 40 parts of a brown water-soluble dyestuff are obtained which has the following constitution:

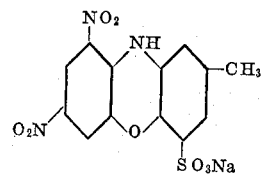

(4) 19 parts of 1-amino-2-hydroxybenzene-5- sulfonic acid are dissolved in a solution prepared from 100 parts of water and 5.5 parts of anhydrous sodium carbonate, 14 parts of crystallized sodium acetate and 25 parts of picryl chloride are added and the whole is heated for one day in a boiling water bath, while stirring. If the mixture is treated, while hot, with caustic soda solution and then with acid as described above, 30 parts of a water-soluble brown dyestuff are obtained. The dyestuff has the following constitution:

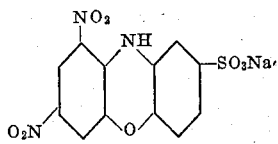

(5) 31.3 parts of the disodium salt of 2-amino-1-phenol-4.6-disulfonic acid are dissolved in 300 parts of hot water and the solution is mixed with 110 parts of a sodium carbonate solution of 10 per cent. strength and 25 parts of picryl chloride. The whole is well stirred for 8 hours at 90° C. to 95° C., filtered hot and the filtrate is evaporated. A light-brown readily soluble dyestuff is obtained in a quantitative yield which is contaminated by a small amount of sodium chloride and nitrite. The dyeing which the dyestuff yields on leather completely penetrate the leather.

We claim:

1. The compounds of the general formula:

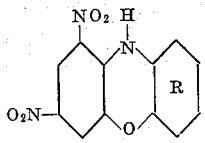

wherein the nucleus R contains a water solubilizing radical of the group consisting of carboxylic acid and sulfonic acid radicals, being water-soluble dyestuffs for wool and leather.

2. The compounds of the general formula:

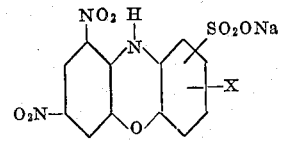

wherein X represents a member of the group consisting of hydrogen, methyl and carboxyl, being water-soluble dyestuffs for wool and leather.

3. The compound of the formula:

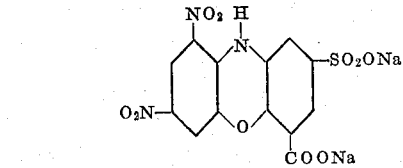

being a brown dyestuff easily soluble in water.

4. The compound of the formula:

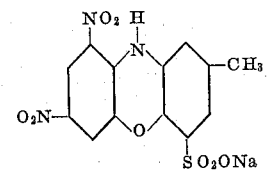

being a brown dyestuff soluble in water.

5. The compound of the formula:

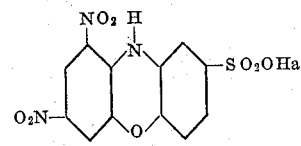

being a brown dyestuff soluble in water.

FRITZ HESS.
HEINZ PARDON.